C. D. STEELE.
COMBINATION SCALE JACK.
APPLICATION FILED NOV. 19, 1919.

1,368,854.

Patented Feb. 15, 1921.

WITNESSES
H. C. Hebig
Geo. L. Beeler

INVENTOR
C. D. Steele
BY
Munn & Co
ATTORNEYS

UNITED STATES PATENT OFFICE.

CHAUNCEY D. STEELE, OF NEW YORK, N. Y.

COMBINATION SCALE-JACK.

1,368,854.  Specification of Letters Patent.  Patented Feb. 15, 1921.

Application filed November 19, 1919. Serial No. 339,126.

*To all whom it may concern:*

Be it known that I, CHAUNCEY D. STEELE, a citizen of the United States, and a resident of the city of New York, borough of Manhattan, in the county and State of New York, have invented a new and Improved Combination Scale-Jack, of which the following is a full, clear, and exact description.

This invention relates to combination devices such for example as lifting jacks and weighing or load indicating devices.

Among the objects of the invention is to provide a relatively simple and hence reliable implement or apparatus easily manipulated and adaptable for use by any ordinary person for the purpose of checking or proving the weight of loads of commodities such as coal, grain, or hay, when carried either on horse drawn vehicles or self-propelled vehicles.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1:
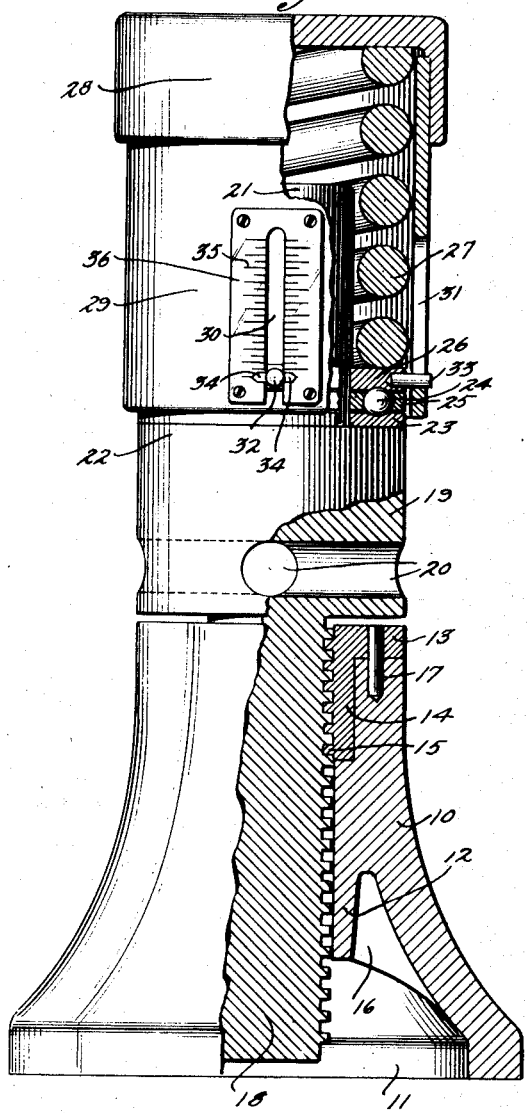
Figure 1 is a side elevation partly in section showing the preferred embodiment of my invention.

Referring now more specifically to the drawings I show at 10 a pedestal of any suitable strong, rigid metal and having a relatively wide base 11 and a central tubular guideway 12. In the upper end of the pedestal is fitted a nut 13 having a downwardly projecting tubular extension 14 with interior threads 15. The bottoms of the threads are in substantial alinement with the inner surface of the guideway 12 which is preferably smooth. In order to insure the maximum strength of the pedestal without excessive weight, the lower end of the guideway 12 is preferably braced by any suitable number of webs 16. The nut 13 is locked in place from both rotation and longitudinal movement by any suitable fastening means such as a pin 17.

Fitted in the guideway 12 and having direct threaded engagement with the nut 13 is a lifting screw 18 of any suitable strong rigid material, the same being provided with a head 19 having transverse radial sockets 20 for the application of a bar or lever not shown for the purpose of rotation of the screw. While the screw coöperates with the nut 13 for lifting and sustaining purposes it coöperates with the guideway to prevent dangerous lateral tilting with respect to the pedestal. Extending upward from the head 19 is a rigid keeper 21 formed preferably as an integral part of the head but of reduced diameter providing an annular shoulder 22 at the top of the head. The upper end of the keeper is preferably flat. Supported upon the shoulder 22 is an anti-friction bearing race 23 having a groove in its upper surface for antifriction balls 24 or their equivalent carried in a cage 25, the upper portions of the balls coöperating with an upper race 26.

Surrounding the keeper 21 and supported upon the upper face of the race 26 is a heavy coil spring 27 of predetermined strength. The spring extends normally above the top of the keeper to a material distance and supports at its upper end a load receiving cap 28 the top of which is flat and is adapted to strike against the flat upper end of the keeper to limit the compression of the spring under maximum loads and prevent damage to the spring. The cap includes a downwardly projecting sleeve 29 which constitutes a skirt or closure for the spring and anti-friction bearings. This sleeve, however is adapted to pass downward freely over the upper portion of the head 19 in practice.

The cap by virtue of the anti-friction bearings is adapted to rotate freely with respect to the pedestal and screw and hence for the purpose of transporting the device from one place to another the operator has simply to grasp the cap with his hands and tilt the device far enough for it to be supported upon the base 11 at one side and by a minimum amount of effort the entire device will be rolled along the ground, the pedestal and screw turning freely as a whole within the cap which the operator holds stationary in his hands.

The sleeve 29 is provided with one or more vertical slots 30 and 31 through which extend outward as many radial pins 32 and 33 which are preferably fixed in the upper annular bearing race 26. Consequently the pins in coöperation with the sleeve serve to hold the race within the sleeve and likewise the spring is held within the sleeve and cap. The pins prevent relative rotation between the cap and the upper race 26. The pin 32 is provided with laterally projecting pointers 34 which coöperate with graduations 35 formed on a plate 36 or the face of the sleeve for the purpose of indicating the load or amount of force required to compress the spring. These graduations may be suitably inscribed in a manner well understood in the scale art so that the amount of load or force may be directly determined.

In practice the device is rolled or otherwise placed beneath an axle of a vehicle and the screw is turned upward with respect to the pedestal, bringing the cap into direct contact with the axle. Up to this time the spring is not compressed, but with the continued upward rotation of the screw, the head thereof and the ball race 23 turning beneath and within the cap, the spring will be compressed while the cap and graduated plate 35 move relatively downward. Since the index pin 32 remains stationary the weight of the load borne upon the cap will be indicated on the index plate. With a device of this sort placed beneath each end of each axle the entire load borne thereon may be readily and accurately determined.

Figure 2:
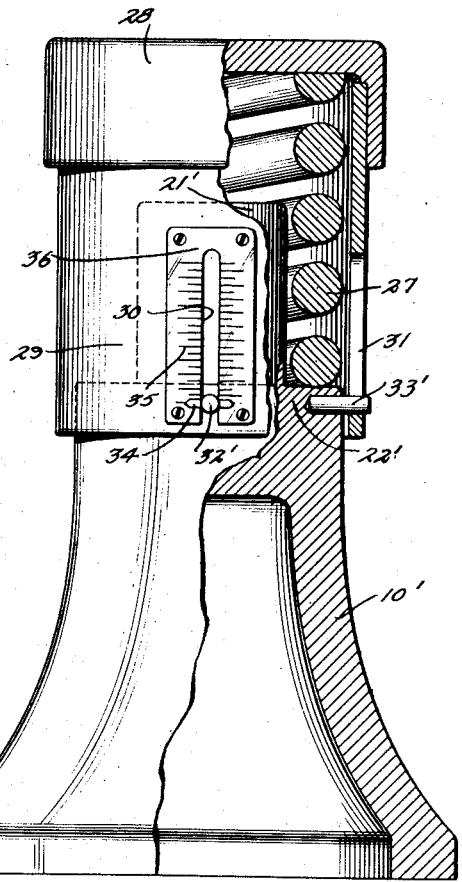
Fig. 2 is a similar view of a modification adapted especially for low built vehicles.

The form of the device shown in Fig. 2 is intended for use in connection with low built vehicles or where there is insufficient head room to admit the longer form shown in Fig. 1. In Fig. 2 the pedestal 10' is of simpler form than in the first figure and formed as an integral part thereof in the keeper 21'. Surrounding the base of the keeper is a shoulder 22' upon which is supported the lower end of a compressible spring 27, the keeper acting as already described as means to prevent tilting or buckling of the spring. The cap 28 and sleeve 29 are or may be essentially the same as already described and serve as an immediate support for the load that is to be weighed thereon. The keeper constitutes a limiting stop for the cap for reasons similar to those set forth above. The index pin 32' and also the guide pin 33' are fixed in the shoulder portion 22' of the pedestal since there is no relative rotation in this form of the invention between the cap and the shouldered portion below it. The index plate 36 and the operation of the device as a weighing implement are the same as in Fig. 1.

In the operation of this shorter form of the device the load such as an automobile or other low built machine is first lifted by some auxiliary jack or lifting device and after it is so lifted this weighing device is slipped beneath the axle and the load permitted to come to rest thereon. The result is otherwise the same as already set forth.

I claim:

1. In a device of the class set forth, the combination of a cap having a downwardly projecting sleeve member, said sleeve member being slotted along its side, there being provided a plurality of slots parallel to each other, a spring within the cap and bearing at its upper end against the interior of the cap, means including a shouldered head to support the lower end of the spring from downward movement, means within the spring and integral with said head serving to prevent buckling of the spring and acting as a stop to limit the downward movement of the cap, and pins projecting outward through said slots serving to prevent relative rotation between the cap and the member supporting the pins, one of said pins coöperating with the downwardly projecting part of the cap to serve as an indicator of the extent of compression of the spring.

2. In a device of the class set forth, the combination of a cap having a flat rigid closed top and a downwardly projecting open bottomed sleeve having a vertical side slot adjacent to the lower end, a compressible spring within the cap and bearing against said flat top, an annular supporting member for the lower end of the spring, a keeper extending upward within the annular member and lower end of the spring and having a flat upper end against which the flat top of the cap is adapted to strike to limit the compression of the spring, and an index pin projecting outward through said slot from the annular member supporting the lower end of the spring, said index pin coöperating with the slotted portion of the sleeve to indicate the extent of compression of the spring under load.

CHAUNCEY D. STEELE.